(12) United States Patent
Wade et al.

(10) Patent No.: US 9,377,835 B2
(45) Date of Patent: Jun. 28, 2016

(54) SYSTEM AND METHOD FOR PROVIDING DYNAMIC CHARGE CURRENT BASED ON MAXIMUM CARD POWER

(71) Applicant: LSI Corporation, San Jose, CA (US)

(72) Inventors: Rex C. Wade, Clarkesville, GA (US); Justin R. McCollum, Lawrenceville, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 262 days.

(21) Appl. No.: 13/921,319

(22) Filed: Jun. 19, 2013

(65) Prior Publication Data

US 2014/0372783 A1    Dec. 18, 2014

Related U.S. Application Data

(60) Provisional application No. 61/835,728, filed on Jun. 17, 2013.

(51) Int. Cl.
*G06F 11/30*     (2006.01)
*G06F 1/32*      (2006.01)

(52) U.S. Cl.
CPC .......... *G06F 1/3206* (2013.01); *G06F 1/3203* (2013.01)

(58) Field of Classification Search
CPC .................................................. G06F 1/3206
USPC ........................................................ 713/340
See application file for complete search history.

(56) References Cited

U.S. PATENT DOCUMENTS

| | | | | |
|---|---|---|---|---|
| 5,283,707 A * | 2/1994 | Conners et al. | ................. | 361/58 |
| 5,910,690 A * | 6/1999 | Dorsey et al. | ................. | 307/141 |
| 2003/0141850 A1* | 7/2003 | Dotzler | ................. | H02J 7/0073 320/137 |
| 2005/0102539 A1* | 5/2005 | Hepner | ................. | G06F 1/206 713/300 |
| 2006/0085655 A1* | 4/2006 | Sung | ................. | G06K 19/0707 713/300 |
| 2006/0129856 A1* | 6/2006 | Main | ................. | G06F 1/266 713/320 |
| 2006/0145673 A1* | 7/2006 | Fogg et al. | ................. | 323/282 |
| 2006/0271804 A1* | 11/2006 | Alperin | ................. | G06F 1/206 713/320 |
| 2007/0007822 A1* | 1/2007 | Cioaca | ................. | H02J 7/0006 307/29 |
| 2007/0069690 A1* | 3/2007 | Hand | ................. | 320/128 |
| 2008/0297118 A1* | 12/2008 | Honma | ................. | H02J 7/0075 320/145 |
| 2009/0206657 A1* | 8/2009 | Vuk | ................. | H01M 10/4264 307/9.1 |
| 2010/0118019 A1* | 5/2010 | Cases | ................. | G06F 1/3218 345/212 |
| 2011/0304966 A1* | 12/2011 | Schrempp | ................. | G06F 1/189 361/679.4 |
| 2012/0139502 A1* | 6/2012 | Schneider | ................. | H02J 7/0055 320/139 |
| 2013/0234677 A1* | 9/2013 | Mok et al. | ................. | 320/164 |

* cited by examiner

*Primary Examiner* — Thomas Lee
*Assistant Examiner* — Volvick Derose

(57) ABSTRACT

Aspects of the disclosure pertain to a system and method for providing dynamic charge current based on maximum expansion card power. Dynamic monitoring of overall power usage by an expansion card is performed. Based on the dynamic monitoring, power consumption of a charging circuit of the card is dynamically adjusted for maintaining the overall power consumption of the expansion card at or below a pre-determined power limit (e.g., at or below an expansion slot power limit). Further, based on the dynamic monitoring, an amount of charging current provided by a current limiting device of the charging circuit to an energy storage device of the charging circuit is dynamically adjusted.

20 Claims, 2 Drawing Sheets

SYSTEM AND METHOD FOR PROVIDING DYNAMIC CHARGE CURRENT BASED ON MAXIMUM CARD POWER

CROSS-REFERENCE TO RELATED APPLICATIONS

This application claims priority to U.S. Provisional Application No. 61/835,728 filed on Jun. 17, 2013, entitled: "System and Method for Providing Dynamic Charge Current Based on Maximum Card Power", which is hereby incorporated by reference in its entirety.

FIELD OF THE INVENTION

The present disclosure relates to the field of expansion cards and particularly to a system and method for providing dynamic charge current based on maximum card power.

BACKGROUND

Expansion cards are typically inserted into expansion slots, such as on a motherboard of a computer system, for electrically connecting electronics on the expansion card and electronics on the motherboard. The expansion card adds functionality to the computer system via an expansion bus. For example, the expansion card provides and/or expands upon features not offered by the motherboard. Expansion cards often include various circuits, such as a charging circuit, which consume power provided via the electrical connection to the expansion slot.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing dynamic charge current based on maximum card power.

DESCRIPTION OF THE FIGURES

The detailed description is described with reference to the accompanying figures.

WRITTEN DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Figure 1:
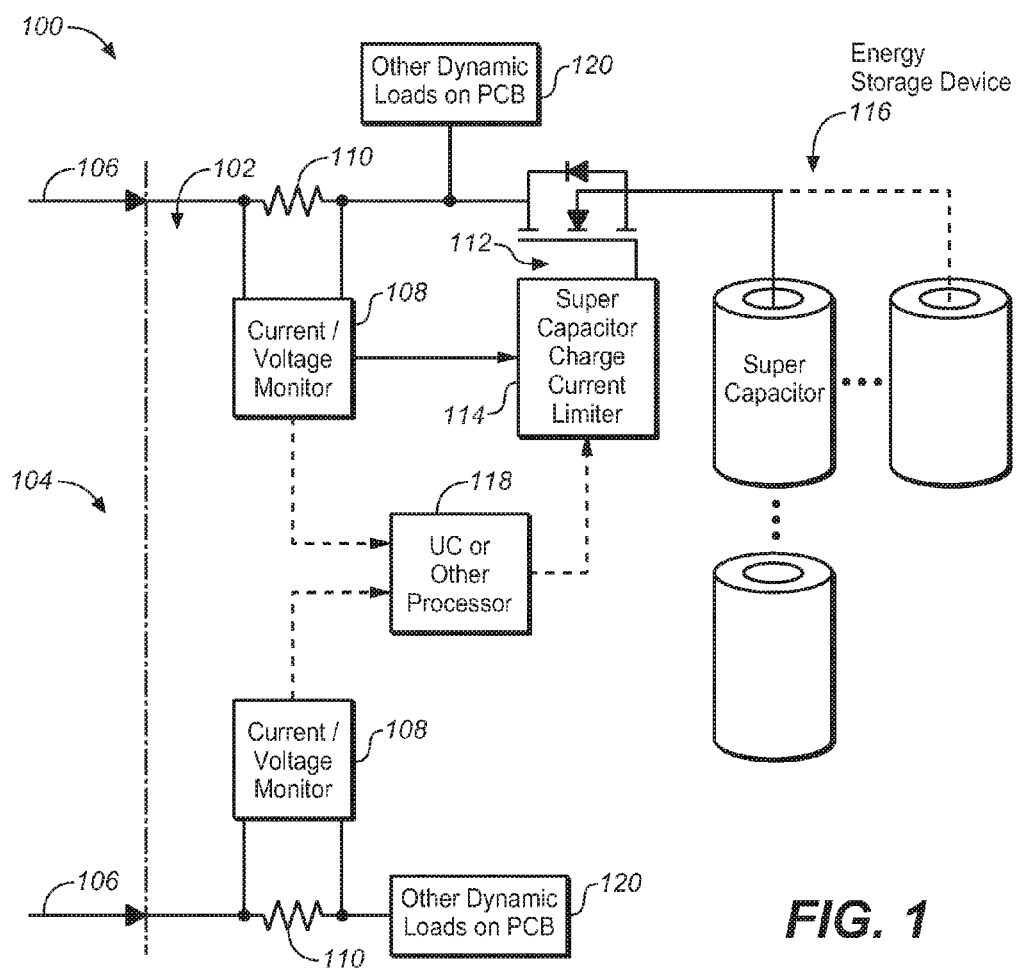
FIG. 1 is an example conceptual block diagram schematic of a system for providing dynamic charge current based on maximum card power in accordance with an exemplary embodiment of the present disclosure.

Referring to FIG. 1 (FIG. 1), a system 100 in accordance with an exemplary embodiment of the present disclosure is shown. In embodiments, the system 100 includes an expansion card 102. In embodiments, the expansion card 102 is a printed circuit board configured for being inserted into an electrical connector or expansion slot on a motherboard, backplane or riser card of a computer system for adding functionality to the computer system via an expansion bus. In embodiments, a primary purpose of the expansion card 102 (e.g., printed circuit board (PCB) card) is to provide and/or expand upon features not offered by the motherboard. For instance, the expansion card 102 may be an interface card, a modem card, a Moving Pictures Experts Group (MPEG) decoder card, a network card, a sound card, a video card, a video capture card, or the like. In embodiments, an edge of the expansion card is configured with (e.g., holds) contacts (e.g., an edge connector or pin header) that are configured for fitting into the expansion slot and establishing electrical contact between electronics on the expansion card 102 and electronics on the motherboard. In embodiments, the expansion card (e.g., peripheral expansion card) 102 includes connectors for external cables.

In embodiments, the system 100 includes an expansion slot (e.g., a card slot, an add-in PCB card slot, a Peripheral Component Interconnect (PCI) slot) 104. In embodiments, the expansion slot 104 is configured for receiving (e.g., being connected to) the expansion card 102. In embodiments, the expansion slot 104 is configured for being connected to a computer system via an expansion bus. In embodiments, the expansion card 102, when connected to (e.g., received by) the expansion slot 104, is configured for being connected to the computer system via the expansion slot 104 and the expansion bus.

In embodiments, the system 100 includes one or more power rails (e.g., PCI rails) 106. In embodiments, the power rails 106 are configured for being connected to the computer system and the expansion slot 104. In embodiments, the power rails 106 are configured for providing power (e.g., operating voltage(s)) from the computer system (e.g., power supply) to the expansion slot 104. For example, the power rails 106 may include a 12-volt (12-V) power rail and a 3.3-volt (3.3-V) power rail. In embodiments, when the expansion card 102 is connected to (e.g., received within) the expansion slot 104, the expansion card 102 is connected to the power rails 106 and receives the power provided from the computer system (e.g., power supply) via the expansion slot 104 and power rails 106.

In embodiments, the expansion card 102 includes one or more monitoring systems (e.g., monitoring circuits) 108. In embodiments, the monitoring systems 108 are configured for being connected to the power rails 106 when the expansion card 102 is connected to (e.g., received within) the expansion slot 104. In embodiments, the monitoring systems 108 are configured for dynamically (e.g., in real time) monitoring power, current and/or voltage provided by the power rails 106 to the expansion card 102 and dynamically providing (e.g., generating and transmitting) one or more outputs (e.g., monitoring system signals) based upon said monitoring. For example, in an embodiment with two power rails 106 and two monitoring systems 108, as shown in FIG. 1, a first of the two monitoring systems 108 is connected to and monitors the power, voltage and/or current provided from a first of the two power rails 106, while a second of the two monitoring systems 108 is connected to and monitors the power, voltage and/or current provided from the second of the two power rails 106. In embodiments, one or more of the monitoring systems 108 each implement (e.g., include) a current sense element 110 for providing the power/current/voltage monitoring functionality. For example, the current sense element 110 may be a field-effect transistor (FET) having a known resistance when the device is in saturation (RDSon).

In embodiments, the expansion card 102 includes a charging circuit (e.g., a supercapacitor charging circuit) 112. In embodiments, the charging circuit 112 is connected to the one or more monitoring systems 108. In embodiments, the charging circuit 112 includes a current limiting device (e.g., a charge current limiter, a charging current limiter, a charger, a current limiter) 114. In embodiments, the charging circuit 112 further includes an energy storage device (e.g., a high capacitance energy pack, a supercapacitor, a battery) 116. In embodiments, the energy storage device 116 is connected to the current limiting device 114. In embodiments, the current limiting device 114 is configured for selectively delivering current to the energy storage device 116 for charging the energy storage device 116. In embodiments, the current limiting device 114 is configured for receiving as inputs the monitoring system signals provided by the one or more monitoring systems 108. In embodiments, the current limiting device 114, based upon the received monitoring system signals (e.g., dynamic signals), is configured for dynamically selecting and/or adjusting an amount of current (e.g., charging current, a maximum charging current limit) that the current limiting device 114 delivers to the energy storage device 116.

In other embodiments, the expansion card 102 includes a processor (e.g., a microcontroller) 118. In embodiments, the processor 118 is connected to the one or more monitoring systems 108 and the current limiting device 114. In embodiments, the processor 118 is configured for dynamically receiving as inputs the monitoring system signals provided by the monitoring systems 108. In embodiments, the processor 118 is configured for dynamically processing the received monitoring system signals. In embodiments, the processor 118 is configured for dynamically providing (e.g., generating and transmitting) one or more outputs (e.g., processor outputs) based upon said processing of the received monitoring system signals. In embodiments, the current limiting device 114 is configured for receiving the processor outputs. In embodiments, the current limiting device 114, based upon the received processor outputs, is configured for dynamically selecting and/or adjusting an amount of current (e.g., charging current, a maximum charging current limit) that the current limiting device 114 delivers to the energy storage device 116. In embodiments, the monitoring systems 108, processor 118, and current limiting device 114 are connected via serial buses to collectively form a digital control and monitoring circuit. In alternative embodiments, rather than implementing the processor 118, a component designed using all analog parts, programmable logic, or ASIC is implemented instead for performing similar/same functions as the processor/microcontroller plus code.

In embodiments, the expansion card 102 includes one or more circuits other than the charging circuit 112, the one or more other circuits (e.g., dynamic loads) being shown in FIG. 1 as other dynamic loads 120 (e.g., dynamic loads other than the charging circuit 112). In embodiments, the other dynamic loads 120 are configured for utilizing (e.g., using, consuming) power (e.g., current, voltage) provided to the card 102 via the power rails 106 and expansion slot 104. In embodiments, the other dynamic loads 120 are connected to the monitoring system(s) 108.

In embodiments, the system 100 is configured for establishing and/or maintaining an amount of input power provided to the expansion card 102 at any given time by the expansion slot 104 and power rail(s) 106 at or below a predetermined power usage threshold. In embodiments, the predetermined power usage threshold for the expansion card 102 corresponds to (e.g., is less than or equal to) a power limit of the expansion slot 104. Example scenarios of how the system 100 provides the herein described functionality are provided below.

Exemplary Scenario #1

In a first exemplary scenario, the power limit of the expansion slot 104 is twenty-five Watts (25 W). Further, in the first exemplary scenario, only one power rail 106 is used by the system 100. For example, the power rail 106 is a 12-V power rail which is configured for providing an amount of power to the expansion slot 104 and the expansion card 102 that is equal to the power limit of the expansion slot (e.g., 25 W). Further, at a given time, other dynamic loads 120 (e.g., dynamic loads other than the charging circuit 112) of the expansion card 102 utilize (e.g., consume) from 15 W to 25 W of power provided by the 12-V power rail 106. When the dynamic loads 120 are using 25 W of power (e.g., peak dynamic load), no power can be utilized by the charging circuit 112 (e.g., no current can be provided by the current limiting device 114 to the energy storage device 116 to charge the energy storage device 116) without violating (e.g., exceeding) the 25 W power limit of the expansion slot 104. When the monitoring system(s) 108 determine (e.g., detect, sense) that the amount of power being used by the dynamic loads 120 is equivalent to the 25 W power limit, the monitoring system(s) 108 provide signal(s) (e.g., monitoring system signal(s)) to the charging circuit 112 for causing the charging circuit 112 to not consume power provided to the expansion card 102 (e.g., for causing the current limiting device 114 to dynamically reduce the amount of current that the current limiting device 114 provides to the energy storage device 116). This prevents the expansion card 102 from consuming power at a level beyond the 25 W power limit of the expansion slot 104.

At times when the dynamic loads 120 utilize less than 25 W of power, the monitoring system(s) 108 detect this and provide signal(s) (e.g., monitoring system signal(s)) to the charging circuit 112 for causing the charging circuit 112 to consume power provided to the expansion card 102 (e.g., for causing the current limiting device 114 to dynamically increase the amount of current that the current limiting device 114 provides to the energy storage device 116). For example, if the dynamic loads 120 are using 15 W of power, the monitoring signals cause the charging circuit 112 to use up to 10 W of power, since the charging circuit 112 can do so without causing the power consumption of the expansion card 102 to exceed the 25 W power limit of the expansion slot 104. Based upon the signal(s) provided by the monitoring system(s) 108, the charging circuit 112 dynamically increases the amount of power it consumes and the current limiting device 114 dynamically increases the amount of current it provides to the energy storage device 116 for charging the energy storage device 116.

Thus, the system 100 allows for dynamic monitoring of overall power usage by the expansion card 102 and provides for dynamic adjustment (e.g., increase, decrease) of the power consumption of charging circuit 112 of the expansion card 102 based upon said monitoring for maintaining the overall power consumption of the expansion card 102 at or below a pre-determined power limit (e.g., at or below a power limit of the expansion slot 104).

Exemplary Scenario #2

In a second exemplary scenario, the power limit of the expansion slot 104 is 25 W. Further, in the second exemplary scenario, two power rails 106 are used by the system 100. For example, the first power rail 106 is a 12-V power rail which is configured for providing an amount of power to the expansion slot 104 and the expansion card 102 that is up to (e.g., equal to) the power limit of the expansion slot (e.g., 25 W), while the second power rail 106 is a 3.3-V power rail which is configured for providing an amount of power to the expansion slot 104 and the expansion card 102 of up to 10 W. However, at any given time, the combined power provided by the two power rails 106 to the expansion card 102 is not to exceed the 25 W power limit of the expansion slot 104.

Further, at a given time, other dynamic loads 120 (e.g., dynamic loads other than the charging circuit 112) of the expansion card 102 utilize (e.g., consume) from 15 W to 25 W of power provided by the power rails 106. When the other dynamic loads 120 are using 25 W of power (e.g., peak dynamic load), no power can be utilized by the charging circuit 112 (e.g., no current can be provided from the current limiting device 114 to the energy storage device 116 to charge the energy storage device 116) without violating (e.g., exceeding) the 25 W power limit of the expansion slot. When the monitoring system(s) 108 determine (e.g., detect, sense) that the amount of power being used by the dynamic loads 120 is equivalent to the 25 W power limit, the monitoring system(s) 108 and/or a processor (e.g., microcontroller) 118 connected to the monitoring system(s) 108 provide signal(s) (e.g., monitoring system signal(s), processor output(s)) to the charging circuit 112 for causing the charging circuit 112 to not consume power provided to the expansion card 102 (e.g., for causing the current limiting device 114 to dynamically reduce the amount of current provided to the energy storage device 116). This prevents the expansion card 102 from consuming power at a level beyond the 25 W power limit of the expansion slot 104.

At times when the dynamic loads 120 utilize less than 25 W of power, the monitoring system(s) 108 detect this and the monitoring system(s) 108 and/or processor 118 provide signal(s) (e.g., monitoring system signal(s), processor output(s)) to the charging circuit 112 for causing the charging circuit 112 to consume power provided to the expansion card 102. For example, if the dynamic loads 120 are using 15 W of power, the signal(s) (e.g., monitoring system signal(s), processor output(s)) cause the charging circuit 112 to use up to 10 W of power, since the charging circuit 112 can do so without causing the power consumption of the expansion card 102 to exceed the 25 W power limit of the expansion slot 104. Based upon the signal(s) provided by the monitoring system(s) 108 and/or processor 118, the charging circuit 112 dynamically increases the amount of power it consumes and the current limiting device 114 dynamically increases the amount of current it provides to the energy storage device 116 for charging the energy storage device 116.

In the second exemplary scenario, since power is concurrently being provided to the expansion card 102 by two power rails 106, the combined power being provided by the two power rails 106 needs to be monitored. For example, the monitoring system(s) 108 and/or a processor 118 connected to the monitoring system(s) 108 may be configured for summing the detected power amounts provided by each of the power rails 106 to determine the overall power being provided to the expansion card 102 at a given moment in time. Further, the monitoring system(s) 108 and/or processor 118 provide signal(s)/output(s) to the charging circuit 112 based upon the determined overall power being provided to the expansion card 102 for causing the charging circuit 112 to dynamically increase or decrease the amount of power it consumes, while causing the current limiting device 114 to dynamically increase or decrease the amount of current it provides to the energy storage device 116.

Thus, the system 100 allows for dynamic monitoring of overall power usage by the expansion card 102 and provides for dynamic adjustment (e.g., increase, decrease) of the power consumption of charging circuit 112 of the expansion card 102 based upon said monitoring for maintaining the overall power consumption of the expansion card 102 at or below a pre-determined power limit (e.g., at or below a power limit of the expansion slot 104).

Exemplary Process of Operation

Figure 2:
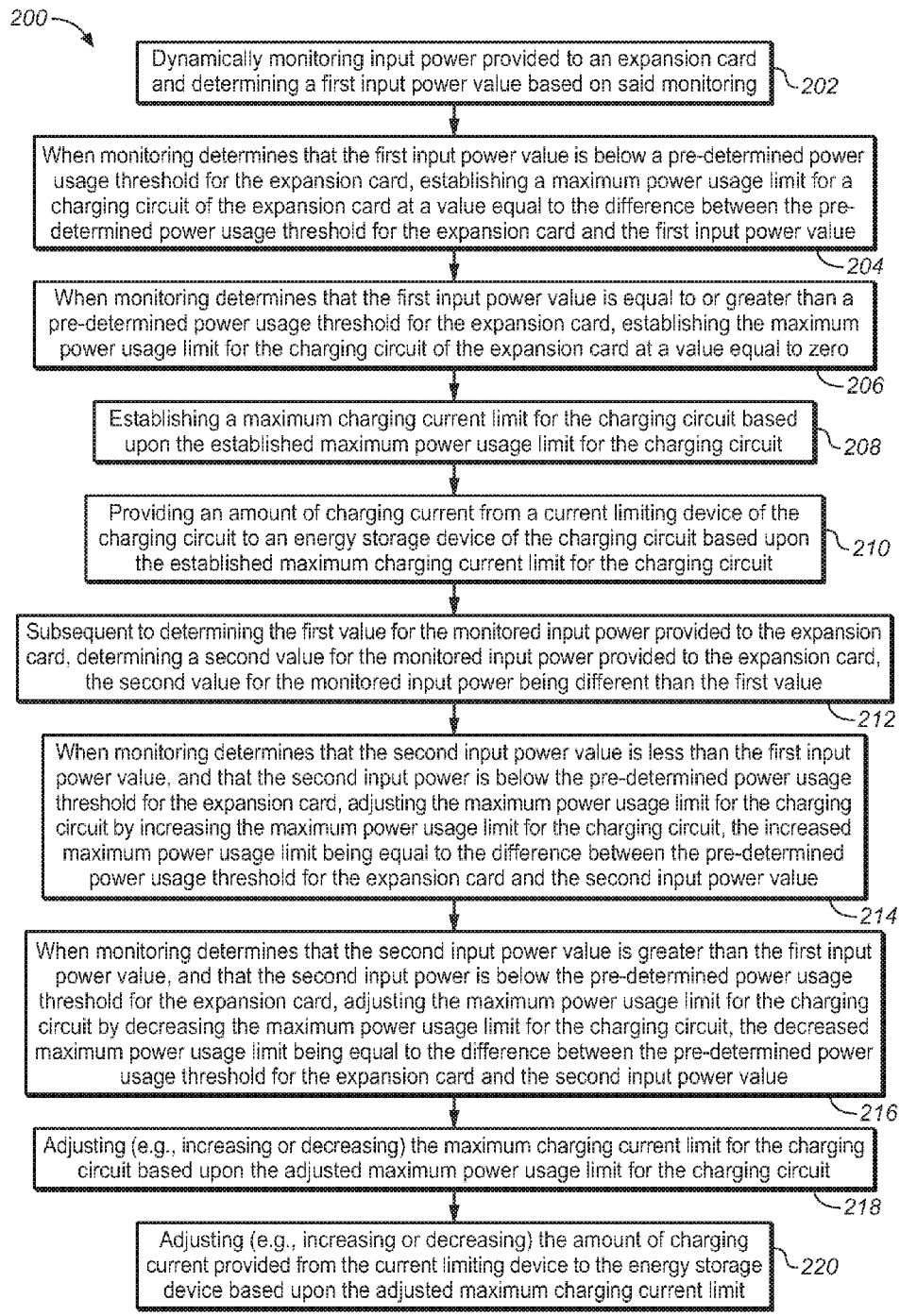
FIG. 2 is a flow chart illustrating a method for providing dynamic charge current based on maximum card power via the system shown in FIG. 1, in accordance with an exemplary embodiment of the present disclosure.

FIG. 2 (FIG. 2) is a flowchart illustrating a process (e.g., method) of operation of the system 100 shown in FIG. 1, in accordance with an exemplary embodiment of the present disclosure. In embodiments, the process 200 includes a step of dynamically monitoring input power provided to an expansion card and determining a first input power value based on said monitoring (Step 202). For example, after initial power up of the system 100, the monitoring system(s) 108 and/or a processor (e.g., microcontroller) 118 of the expansion card 102 are configured for dynamically monitoring an input power provided by the power rail(s) 106 to the expansion card 102.

In embodiments, the process 200 further includes a step of, when monitoring determines that the first input power value is below a pre-determined power usage threshold for the expansion card, establishing a maximum power usage limit for a charging circuit of the expansion card at a value equal to the difference between the pre-determined power usage threshold for the expansion card and the first input power value (Step 204). In embodiments, the pre-determined power usage threshold for the expansion card 102 may be equivalent to a power limit for the expansion slot 104 to which the expansion card 102 is connected. For example, if the pre-determined power usage threshold for the expansion card (e.g., the power limit for the expansion slot) is equal to 25 W and the first input power value (e.g., the input power being utilized by dynamic loads 120 of the card 102 other than the charging circuit 112) is measured at 15 W, the maximum power usage limit for the charging circuit 112 of the card 102 is established at 10 W.

In embodiments, the process 200 further includes a step of, when monitoring determines that the first input power value is equal to or greater than a pre-determined power usage threshold for the expansion card, establishing the maximum power usage limit for the charging circuit of the expansion card at a value equal to zero (Step 206). For example, if the pre-determined power usage threshold for the expansion card (e.g., the power limit for the expansion slot) is equal to 25 W and the first input power value (e.g., the input power being utilized by the other dynamic loads 120 of the card 102) is measured at 25 W, the maximum power usage limit for the charging circuit 112 of the card 102 is established at 0 W.

In embodiments, the process 200 further includes a step of establishing a maximum charging current limit for the charging circuit based upon the established maximum power usage limit for the charging circuit (Step 208). For example, if the established maximum power usage limit for the charging circuit 112 is 0 W, then the established maximum charging current limit of the charging circuit is zero. However, if the established maximum power usage limit for the charging circuit 112 is greater than 0 W, then the established maximum charging current limit of the charging circuit is greater than zero.

In embodiments, the process 200 further includes a step of providing an amount of charging current from a current limiting device of the charging circuit to an energy storage device of the charging circuit based upon the established maximum charging current limit for the charging circuit (Step 210). For example, charging current is provided from the current limiting device 114 to the energy storage device 116 in an amount commensurate with (e.g., up to) the established maximum charging current limit for the charging circuit 112.

In embodiments, the process 200 further includes, subsequent to determining the first value for the monitored input power provided to the expansion card, determining a second value for the monitored input power provided to the expansion card, the second value for the monitored input power being different than the first value (Step 212). For example, over time, the monitored input power provided to the expansion card 102 (e.g., the power utilized by other dynamic loads 120 of the card 102) may be determined (e.g., detected) by the monitoring system(s) 108 and/or processor (e.g. microcontroller) 118 as having increased or decreased.

In embodiments, the process 200 further includes, when monitoring determines that the second input power value is less than the first input power value, and that the second input power is below the pre-determined power usage threshold for the expansion card, adjusting the maximum power usage limit for the charging circuit by increasing the maximum power usage limit for the charging circuit, the increased maximum power usage limit being equal to the difference between the pre-determined power usage threshold for the expansion card and the second input power value (Step 214). For example, if the pre-determined power usage threshold for the expansion card (e.g., the power limit for the expansion slot) is equal to 25 W and the second input power value is measured at 10 W, the maximum power usage limit for the charging circuit 112 is increased to 15 W.

In embodiments, the process 200 further includes a step of, when monitoring determines that the second input power value is greater than the first input power value, and that the second input power is below the pre-determined power usage threshold for the expansion card, adjusting the maximum power usage limit for the charging circuit by decreasing the maximum power usage limit for the charging circuit, the decreased maximum power usage limit being equal to the difference between the pre-determined power usage threshold for the expansion card and the second input power value (Step 216). For example, if the pre-determined power usage threshold for the expansion card (e.g., the power limit for the expansion slot) is equal to 25 W and the second input power value is measured at 20 W, the maximum power usage limit for the charging circuit 112 is decreased to 5 W.

In embodiments, the process 200 further includes a step of adjusting (e.g., increasing or decreasing) the maximum charging current limit for the charging circuit based upon the adjusted maximum power usage limit for the charging circuit (Step 218).

In embodiments, the process 200 further includes a step of adjusting (e.g., increasing or decreasing) the amount of charging current provided from the current limiting device to the energy storage device based upon the adjusted maximum charging current limit (Step 220).

The system 100 and method 200 described herein allow for the charging current limit (e.g., the maximum amount of current that the current limiting device 114 provides to the energy storage device 116) to be based upon dynamic (e.g., real time) power usage by the expansion card 102. In embodiments, the system 100 and method 200 described herein implement an analog or digital control loop for providing the herein described functionality of the system 100. Further, the system 100 and method 200 described herein promote the ability of the expansion card 102 to not exceed the power limit of the expansion slot 104 (e.g., the card power specification) by allocating charge current based on present card power usage. Still further, the system 100 and method 200 described herein promote minimized charge time of the energy storage device 116 by allowing for dynamically adjustable (e.g., increasable) charger current limits. Further, because the system 100 and method 200 described herein allow for dynamically adjustable (e.g., increasable) charger current limits, increased efficiency is promoted since the system 100 can dynamically adjust to allow the card 102 to use the card power specification balance at any given time.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operating an expansion card, comprising:
monitoring, via a monitoring circuit of the expansion card, input power consumed by components of the expansion card receiving power from power rails that each provide power to the expansion card at a different level of voltage, wherein the input power includes power consumed by the components from each of the power rails;
when monitoring determines that the input power is below a threshold, establishing a power limit for a charging circuit of the expansion card at a value equal to the difference between the threshold and the input power;
when monitoring determines that the input power is equal to or greater than the threshold, establishing the power limit at a value equal to zero; and
establishing a current limit for the charging circuit based upon the power limit.

2. The method as claimed in claim 1, further comprising:
providing an amount of charging current from a current limiting device of the charging circuit to an energy storage device of the charging circuit based upon the current limit.

3. The method as claimed in claim 1, further comprising:
monitoring the input power in real-time.

4. The method as claimed in claim 1, further comprising:
increasing the current limit if the input power reduces over time.

5. The method as claimed in claim 1, further comprising:
decreasing the current limit if the input power increases over time.

6. The method as claimed in claim 1, wherein:
the power rails are coupled with an expansion slot that the expansion card is inserted into.

7. The method as claimed in claim 1, wherein:
one of the power rails provides power at 12 volts, and another of the power rails provides power at 3.3 volts.

8. A non-transitory computer-readable medium having computer-executable instructions for performing a method of operating an expansion card, the method comprising:
monitoring, via a monitoring circuit of the expansion card, input power consumed by components of the expansion card receiving power from power rails that each provide power to the expansion card at a different level of voltage, wherein the input power includes power consumed by the components from each of the power rails;
when monitoring determines that the input power is below a threshold, establishing a power limit for a charging circuit of the expansion card at a value equal to the difference between the threshold and the input power;
when monitoring determines that the input power is equal to or greater than the threshold, establishing the power limit at a value equal to zero;
establishing a current limit for the charging circuit based upon the power limit; and
providing an amount of charging current from a current limiting device of the charging circuit to an energy storage device of the charging circuit based upon the current limit.

9. The non-transitory computer-readable medium as claimed in claim 8, the method further comprising:
monitoring the input power in real-time.

10. The non-transitory computer-readable medium as claimed in claim 8, the method further comprising:
increasing the current limit if the input power reduces over time.

11. The non-transitory computer-readable medium as claimed in claim 8, the method further comprising:
decreasing the current limit if the input power increases over time.

12. The non-transitory computer-readable medium as claimed in claim 8, wherein
the power rails are coupled with an expansion slot that the expansion card is inserted into.

13. The non-transitory computer-readable medium as claimed in claim 8, wherein:
one of the power rails provides power at 12 volts, and another of the power rails provides power at 3.3 volts.

14. An expansion card, comprising:
a monitoring system configured for monitoring input power consumed by components of the expansion card from power rails that each provide power to the expansion card at a different level of voltage, wherein the input power includes power consumed by the components from each of the power rails; and
a charging circuit connected to the monitoring system,
the charging circuit including a current limiting device and also including an energy storage device that is connected to the current limiting device, wherein the current limiting device is configured for providing electrical current to charge the energy storage device,
wherein when the monitoring system determines that the input power is below a threshold, it establishes a power limit for the charging circuit at a value equal to the difference between the threshold and the input power,
wherein when the monitoring system determines that the input power is equal to or greater than the threshold, it establishes the power limit at a value equal to zero, and
wherein the current limiting device establishes a current limit for the charging circuit based upon the power limit.

15. The expansion card as claimed in claim 14, further comprising:
a second monitoring system configured for dynamically monitoring input power provided to the expansion card.

16. The expansion card as claimed in claim 15, further comprising:
a processor, the processor being connected to the monitoring systems and the charging circuit.

17. The expansion card as claimed in claim 16, wherein the monitoring systems are configured for providing outputs to the processor based upon the input power.

18. The expansion card as claimed in claim 17, wherein the processor, based upon the monitoring system outputs, provides an output to the charging circuit.

19. The expansion card as claimed in claim 18, wherein the current limiting device dynamically adjusts an amount of electrical current the current limiting device provides to the energy storage device based on the processor output.

20. The expansion card as claimed in claim 16, wherein the processor is a microcontroller.

* * * * *